(12) United States Patent
Ingels et al.

(10) Patent No.: US 8,171,252 B2
(45) Date of Patent: May 1, 2012

(54) SHARING OF NON-DIVISIBLE FILES

(75) Inventors: Didier Ingels, Grand Rosiere (BE); Guy Restiau, Rixensart (BE)

(73) Assignee: Proton World International N.V., Zaventem (BE)

( * ) Notice: Subject to any disclaimer, the term of this patent is extended or adjusted under 35 U.S.C. 154(b) by 676 days.

(21) Appl. No.: 11/102,040

(22) Filed: Apr. 8, 2005

(65) Prior Publication Data

US 2005/0234861 A1 Oct. 20, 2005

(30) Foreign Application Priority Data

Apr. 9, 2004 (FR) ..................................... 04 50726

(51) Int. Cl.
*G06F 13/00* (2006.01)
*G06F 9/26* (2006.01)
(52) U.S. Cl. ........................................ 711/173; 707/785
(58) Field of Classification Search .................. 707/785, 707/781; 711/173, 163
See application file for complete search history.

(56) References Cited

U.S. PATENT DOCUMENTS

| | | | |
|---|---|---|---|
| 4,611,298 A * | 9/1986 | Schuldt ............................. 707/1 |
| 5,161,256 A | 11/1992 | Iijima | |
| 5,335,346 A * | 8/1994 | Fabbio ........................ 711/163 |
| 5,920,887 A * | 7/1999 | Sokolov et al. ............... 711/113 |
| 6,003,113 A | 12/1999 | Hoshino | |
| 6,085,191 A * | 7/2000 | Fisher et al. ...................... 707/9 |
| 6,292,874 B1 * | 9/2001 | Barnett .......................... 711/153 |
| 6,480,935 B1 * | 11/2002 | Carper et al. .................. 711/115 |
| 6,493,800 B1 * | 12/2002 | Blumrich ....................... 711/129 |
| 6,499,059 B1 * | 12/2002 | Banzhaf ........................ 709/229 |
| 7,158,989 B2 * | 1/2007 | Saltz ............................. 707/102 |
| 7,401,358 B1 * | 7/2008 | Christie et al. .................. 726/21 |
| 2002/0118095 A1 * | 8/2002 | Estes ............................. 340/5.6 |
| 2003/0149854 A1 * | 8/2003 | Yoshino et al. ............... 711/173 |
| 2006/0101506 A1 * | 5/2006 | Gallo et al. ...................... 726/3 |
| 2007/0083491 A1 * | 4/2007 | Walmsley et al. ................ 707/3 |

* cited by examiner

*Primary Examiner* — Etienne Leroux
*Assistant Examiner* — Mohammad Rahman
(74) *Attorney, Agent, or Firm* — Wolf, Greenfield & Sacks, P.C.

(57) ABSTRACT

A method and a system for sharing files recorded by non-divisible sections in a first memory, including dividing each section into subsets to which are respectively assigned specific access rights; storing, in a second memory, separate from the first one, a specification table comprising at least the location of each subset in the section, at least one key conditioning the access to this subset, and the rights assigned to the key; and conditioning the accesses to the subsets to their respective specifications by a control performed by a microprocessor.

31 Claims, 1 Drawing Sheet

| | OFF | L | KEY | ACC |
|---|---|---|---|---|
| Z1 | 0 | 18 | K1 | R,W |
| Z2 | 4 | 6 | K2 | W(C) |
| Z3 | 12 | 16 | K3 | R |
| Z4 | 13 | 19 | K4 | R,W |
| Z4' | 13 | 19 | K4' | E |

20

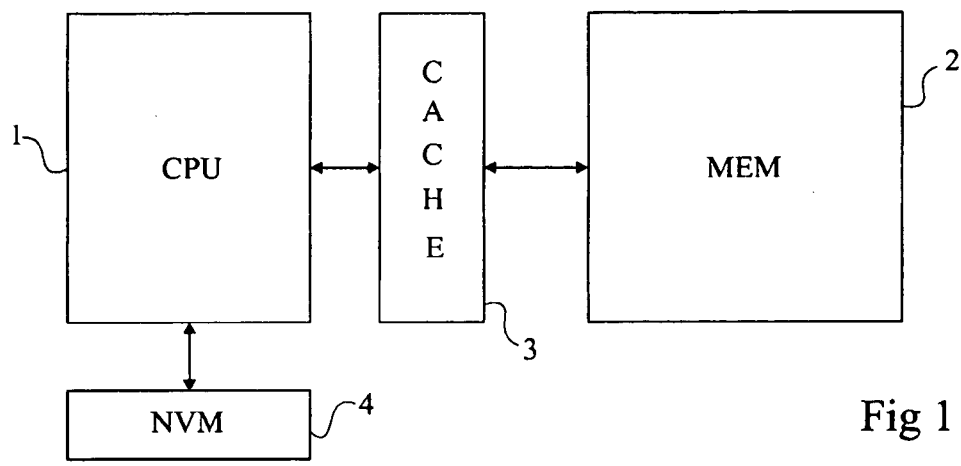
Fig 1
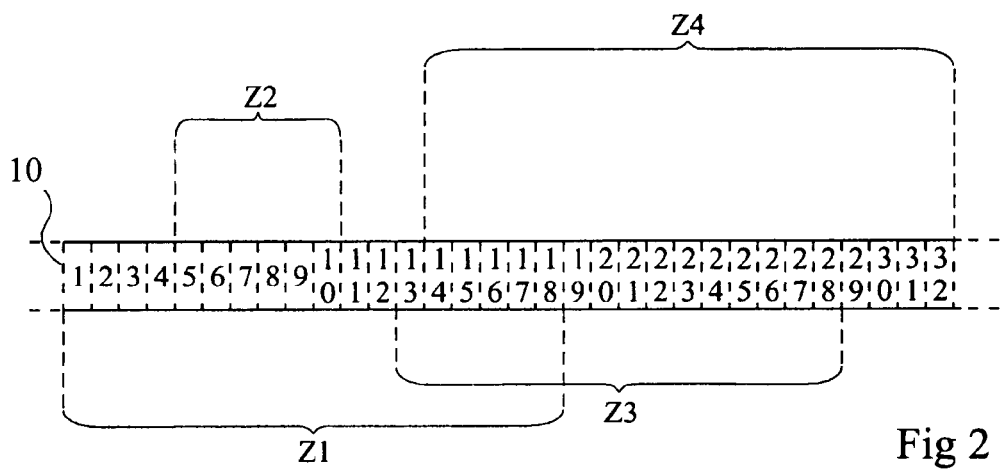
Fig 2
Fig 3

SHARING OF NON-DIVISIBLE FILES

BACKGROUND OF THE INVENTION

1. Field of the Invention

The present invention generally relates to digital data files stored in a memory and, more specifically, files with non-divisible sections, that is, having their physical recording in a memory area performed by sections of fixed length or linearly.

The present invention more specifically relates to the management of the accesses to files according to rights (of writing, reading, deleting, copying, etc.) granted to users or to applications. Such rights are a function of keys or codes which are assigned to the different users or to the different functions or applications.

The present invention more specifically applies to the field of smart cards or the like for which the file system processes non-divisible sections of fixed size.

2. Discussion of the Related Art

Currently, a key conditioning rights of access to a file having as a parameter to have to be written in non-divisible fashion by sections or linearly, can only be assigned to the entire file or to a section of this file. The distribution of the rights of access must be compatible with the granularity (minimum size) of each section read from or written into the memory.

This constraint is little disturbing in applications where the memory is almost unlimited (computer hard disk, for example). However, in applications of smart card type, or more generally as soon as the memory size is critical with respect to the information volume to be stored, the granularity of the file section often curbs the increase of the number of applications that the system can process.

For example, in the case of a contactless smart card (transponder) applied to the management of transport documents, the management systems (size of the exploited information, number of different categories of access rights, etc.) often differ from one network to another (from one town to another, from one operator to another, from one country to another, etc.). For a same smart card to be able to operate on several networks, it must comprise as many files as there are networks, each file being dedicated to a network.

Such a limitation reduces the possibilities of sharing a smart card between several applications.

The same problems are posed, even for variable-size sections, if the file writing is linear, that is, not dividable at will. For simplification, reference will be made hereafter to the granularity of data in a memory to designate the minimum size of the undividable sections which can be read from it or written into it. However, all that will be described in relation with granularity applies to linear-writing variable-size sections.

A solution would be to decrease the granularity of the memory sections (in the extreme, down to a bit) according to the minimum size of the information to which specific access rights are desired to be granted. Such a theoretical solution however cannot be envisaged in practice, for several reasons.

First, this solution would require modifying the memory management devices (direct memory access controller or DMA), or even the memory structure (granularity of the input-output amplifiers).

Further, the access right management would require assigning a key to each element of minimum granularity. This would multiply the number of keys and would require, only to manage the rights, a memory of a size greater than that of the memory containing the information.

Further, the user or the application supposed to have access would have to have as many keys as there are sections. Such a system would accordingly rapidly become unmanageable.

SUMMARY OF THE INVENTION

The present invention aims at overcoming the disadvantages of known methods for managing files with a linear writing or a writing by non-divisible sections.

The present invention especially aims at providing a solution to share a same file between different systems.

The present invention also aims at making the access right management independent (in terms of data size) from the granularity of the data in a memory.

To achieve these and other objects, the present invention provides a method for sharing files recorded by non-divisible sections in a first memory, comprising:

dividing each section into subsets to which are respectively assigned specific access rights;

storing, in a second memory, separate from the first one, a specification table comprising at least the location of each subset in the section, at least one key conditioning the access to this subset and the rights assigned to the key; and conditioning the accesses to said subsets to their respective specifications by a control performed by a microprocessor.

According to an embodiment of the present invention, said files are transferred between said first memory and a third memory by entire sections, the access control being performed based on the content of the third memory.

According to an embodiment of the present invention, the location comprises:

an offset value of the beginning of the subset with respect to the beginning of the section; and the length of the subset.

According to an embodiment of the present invention, the specification of a subset further comprises an information about the type of data that it contains.

According to an embodiment of the present invention, the subsets of a same section are nested in one another.

The present invention also provides a system for sharing files recorded by non-divisible sections in a first memory, comprising:

a microprocessor for managing the accesses to the data contained in the sections by subsets to which are respectively assigned specific access rights;

a second memory, separate from the first one, containing at least a table of specifications comprising at least the location of each subset in the section, at least one key conditioning the access to this subset and the rights assigned to the key.

According to an embodiment of the present invention, the system further comprises a third memory for transferring, by entire sections, information contained in the files.

According to an embodiment of the present invention, the third memory is a cache memory, the second memory being a non-volatile memory.

The present invention further provides a smart card comprising a file sharing system.

The foregoing objects, features, and advantages of the present invention, as well as others, will be discussed in detail in the following non-limiting description of specific embodiments in connection with the accompanying drawings.

BRIEF DESCRIPTION OF THE DRAWINGS

FIG. 1 very schematically shows in the form of blocks an example of a device of smart card type to which the present invention applies;

FIG. 2 shows an example of a division of a file section into subsets according to an embodiment of the present invention; and FIG. 3 illustrates an example of a specification table according to an embodiment of the present invention.

DETAILED DESCRIPTION

The same elements have been designated with the same reference numerals in the different drawings. For clarity, only those elements which are necessary to the understanding of the present invention have been shown in the drawings and will be described hereafter. In particular, the generation of the keys conditioning the rights of access to the different sections has not been described in detail. The present invention is compatible with any conventional key assignment system.

A feature of the present invention is to divide each file section into subsets independent from one another and defined by a start bit rank (position) in the section and a length (bit number). Another feature of the present invention is to assign to each subset access rights conditioned by one or several keys.

According to the present invention, the file read-write mode in the memory is not modified. Only once the sections are directly exploitable by the processor exploiting the data, more specifically in registers or a cache memory, does the present invention carry out the processing by subsets.

FIG. 1 very schematically shows in the form of blocks an example of a smart card for the implementation of the present invention.

In this example, a processor 1 (CPU) has the function of executing applications (programs) based on data stored in a memory 2 (MEM). Memory 2 is, for example, a memory in which the data are stored by words of 32 bits, which is the minimum size (granularity) of a section capable of being read or written. In the meaning of the present invention, term "data" encompasses any type of digital data, whatever their destination. In particular, although these data, the access to which is desired to be controlled, preferentially are data exploited by programs, this designation encompasses the actual programs which, from the point of view of memory 2, are bits to be read and written.

Conventionally, a cache memory 3 (CACHE) or a register bank is used as a buffer between memory 2 and processor 1. The management of the exchanges between cache memory 3, memory 2, and processor 1 is within the abilities of those skilled in the art and implements a conventional operation. In FIG. 1, the data exchange or control links have been symbolized by arrows. In practice, the information generally transits over one or several buses, shared or not, but this has no incidence upon the present invention.

The present invention takes advantage of the presence of this intermediary storage element (cache or registers) between memory 2 and processor 1, generally provided for rapidity reasons, to divide the data into subsets when they are in this "intermediary memory".

Regarding the security with respect to the access controls defined by the keys assigned to the different subsets, the present invention generates no weakness since the cache memory is associated with the processor, that is, it can be considered as being in as tamper resistant an area as the actual processor.

According to the present invention, a correspondence table is stored in an area of memory 2 for transfer into memory 3 before any exploitation of the data, or preferentially in an area of a non-volatile memory 4 (NVM) of the chip. This table contains, according to the present invention and for each subset, a specification of the subset in terms of location and of access rights. Thus, for each subset, the specification stored in the table comprises at least a start position (position of the first bit of the subset in the file section) and a length (number of bits of the subset). The start position may be expressed in the form of an offset with respect to the first bit of the section. The specification also contains, in relation with each subset, a category of access rights and, preferably, a concerned data type (counter, free data, date, etc.). This last information optimizes the access control by allowing a verification not only of the key but also of the data type. For simplification, reference will be made hereafter to access rights to indifferently designate the operations performed on the data and the type of concerned data, controlling the data type actually amounting to specializing (adding a condition to) a write access right.

The division of each file section performed by the present invention may indifferently result in subsets formed of separate bit sequences, in imbricate subsets, etc.

FIG. 2 illustrates, in a simplified representation of a section 10 of bits stored in a memory, an example of implementation of the present invention.

FIG. 3 shows an example of a table 20 containing the specifications of the subsets of FIG. 2.

In the example of FIG. 2, four subsets Z1 to Z4 have been defined in a 32-bit section forming a word storable in undividable fashion in the memory (2, FIG. 1). For simplification, the bits have been designated from 1 to 32. Subsets Z1 to Z4 respectively comprise bits 1 to 12, 5 to 10, 13 to 28, and 14 to 32.

To each subset are assigned specific access rights which are conditioned by the provision of at least one key (KEY, FIG. 3). In the considered example, keys K1 to K3 are assigned to respective subsets Z1 to Z3. It is assumed that two keys K4 and K4' condition different rights on a same subset Z4. This amounts to considering the existence of two subsets Z4 and Z4' of same coordinates to which are respectively assigned keys K4 and K4'.

Thus, in the table of FIG. 3, the respective initial offsets (OFF) of the subsets are 0, 4, 12, 13, and 13 and their respective lengths (L) are 18, 6, 16, 19, and 19.

The respective rights are reading (R) and writing (W) for area Z1, writing in counter mode (WC) in area Z2, reading (R) in area Z3, reading (R) and writing (W) in area Z4, erasing (E) in area Z4'. For simplification, the data type specification has been mixed with the key. In practice, it will however be preferred to distinguish a code indicating the data type from the actual access right.

Other accesses and types than those given hereabove as an example are of course possible.

Similarly, the keys may correspond to security mechanisms different from one another. For example, some keys may be internal to the device (the smart card), others may be keyed in by the user while the card is in a reader. Others still may come from a dialog with a distant system (for example, a server connected to the reader) based on a mechanism with public and private keys.

An advantage of the present invention is that the non-divisible section storable in the memory (here, 32 bits) can now be managed like several areas different from one another and over which the access rights are different. The selection, from the section, of the bits of the considered subset, is performed in the cache memory (3, FIG. 1) where the section is entirely available. In other words, the access right management is no longer performed upon transfer to or from memory 2, but while the information is in the cache memory associated with the CPU. This enables, among others, respecting the access right management rapidity constraints required by most applications.

Considering again the example of smart cards in the transportation field (transport document management), it is now no longer necessary to assign one file (one section) per system or town. A same section can be shared by several systems to which are respectively assigned different subsets. Thus, a same end product (smart card) of limited memory capacity can be used, for example, in several towns.

Another advantage of the present invention is that the organization of the file sharing is independent from the memory (2) in which they are stored, except regarding the section size. Indeed, be it in the read direction (from memory 2 to CPU 1) or in the write direction (from CPU 1 to memory 2), the sections are always transferred entirely from or towards memory 2, the access management per subset being performed at the level of cache memory 3. The memory management provided by the present invention is thus adaptable to multiple systems.

Of course, the present invention is likely to have various alterations, modifications, and improvements which will readily occur to those skilled in the art. In particular, the programming of a smart card or of any other similar electronic element for the implementation of the present invention is within the abilities of those skilled in the art based on the functional indications given hereabove. Further, the possible modification of the electronic element so that it contains the assignment table of the present invention is also within the abilities of those skilled in the art. Moreover, although the present invention has been described in relation with a specific example with files of fixed size as concerns their reading-writing into the memory, the transposition of the present invention to variable-size files with a linear reading-writing (which amounts to a reading-writing per block as to transfers into the cache memory of the processor) will pose no difficulty to those skilled in the art.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for sharing files recorded by non-divisible sections in a first memory, the first memory being adapted to read and write data in units of a minimum size, comprising:
    assigning specific access rights to subsets of at least one section of the non-divisible sections, each of the non-divisible sections having a size equal to the minimum size;
    storing, in a second memory, separate from the first memory, a table of specifications comprising:
        at least a location of each subset in the at least one section;
        at least one key conditioning access to each subset; and
        the specific access rights associated with each of the at least one key; and
    conditioning access to a subset through a control performed by a microprocessor, wherein the control comprises authenticating the access by comparing a submitted key to the at least one key of the subset to determine whether the access is a type of access permitted by the specific access rights associated with a key matching the submitted key.

2. The method of claim 1, wherein said files are transferred between said first memory and a third memory by entire sections, the access control being performed based on content of the third memory.

3. The method of claim 1, wherein the location comprises:
    an offset value of a beginning of the subset with respect to a beginning of the at least one section; and
    a length of the subset.

4. The method of claim 1, wherein the specification of a subset further comprises an information about a type of data that the subset contains.

5. A method for sharing files recorded by non-divisible sections in a first memory, the first memory being adapted to read and write data in units of a minimum size, the method comprising:
    assigning specific access rights to subsets of at least one section of the non-divisible sections, each of the non-divisible sections having a size equal to the minimum size;
    storing, in a second memory, separate from the first memory, a table of specifications comprising:
        at least a location of each subset in the at least one section;
        at least one key conditioning access to each subset; and
        the specific access rights associated with each of the at least one key,
        wherein at least one first subset and at least one second subset of a section of the at least one section are stored in overlapping locations in the section.

6. The method of claim 5, wherein the at least one first subset and the at least one second subset are stored in overlapping locations when at least a first portion of data of the at least one first subset and at least a second portion of data of the at least one second subset have same values.

7. The method of claim 6, wherein the first portion and the second portion are stored in a same location in the section of the first memory.

8. A system for sharing files recorded by non-divisible sections in a first memory, the first memory being adapted to read and write data in units of a minimum size, comprising:
    a microprocessor for managing accesses to data contained in the non-divisible sections, specific access rights being assigned to subsets of at least one section of the non-divisible sections based on corresponding keys, each of the non-divisible sections having a size equal to the minimum size; and
    a second memory, separate from the first memory, the second memory containing at least a table of specifications comprising:
        at least a location of each subset in the at least one section;
        at least one key conditioning the specific access rights; and
        the specific access rights associated with each of the at least one key,
    wherein the microprocessor is adapted to permit or deny an access to a subset by comparing a submitted key to the at least one key of the subset to determine whether the access is a type of access permitted by the specific access rights associated with a key matching the submitted key.

9. The system of claim 8, further comprising a third memory for transferring, by entire sections, information contained in the files.

10. The system of claim 9, wherein the third memory is a cache memory, the second memory being a non-volatile memory.

11. A smart card comprising the system of claim 8.

12. An apparatus, comprising:
a first memory adapted to read and write data to non-divisible sections, the first memory being adapted to read and write the data in units of a minimum size and each of the non-divisible sections having a size equal to the minimum size; and
a second memory storing first infoimation, the first information comprising:
at least one identifier for identifying at least one subset of the at least one section of non-divisible data;
at least one key assigned to the at least one subset each permitting specified types of access to the at least one subset; and
at least one access right associated with each of the at least one key.

13. The apparatus of claim 12, further comprising a third memory and a microprocessor, the third memory storing the at least one section of the at least one file as it is transferred from the first memory to the microprocessor.

14. The apparatus of claim 13, wherein the third memory is a cache memory and the second memory is a non-volatile memory, and wherein the second memory is connected to the microprocessor.

15. The apparatus of claim 13, wherein the microprocessor manages access to data contained in the first memory and third memory.

16. The apparatus of claim 12, wherein the at least one identifier comprises an offset value and/or a length value.

17. The apparatus of claim 12, wherein the at least one access right includes at least one of reading right, a writing right, an erasing right, and a writing in counter mode right.

18. A smart card comprising the apparatus of claim 12.

19. An apparatus, comprising:
a first memory adapted to read and write data to non-divisible sections, the first memory being adapted to read and write the data in units of a minimum size and each of the non-divisible sections having a size equal to the minimum size; and
a second memory storing first information, the first information comprising:
at least one identifier for identifying at least one subset of the at least one section of non-divisible data;
at least one key assigned to the at least one subset for permitting access to the at least one subset; and
at least one access right assigned to the at least one subset,
wherein a first subset of the at least one subset of a section overlaps a second subset of the at least one subset of the section.

20. The apparatus of claim 19, wherein the first subset overlaps the second subset when at least a first portion of data of the first subset and at least a second portion of data of the second subset have same values.

21. The apparatus of claim 20, wherein the first portion and the second portion are stored in a same location in the section of the first memory.

22. A method of storing data in a first memory, the first memory being divided into at least one fixed-size memory unit each being of a first size, the memory being adapted to read and write one data unit per fixed-size memory unit, the method comprising:
storing a plurality of data units within a fixed-size memory unit, the fixed-size memory unit having a size equal to the first size and each of the plurality of data units being of a size less than the first size; and
storing a memory use table comprising information on each of the plurality of data units within the fixed-size memory unit, the memory use table comprising, for each data unit,
a location of the data unit in the fixed-size memory unit, and
a key to authenticate access to the data unit.

23. The method of claim 22, further comprising:
retrieving the fixed-size memory unit from the first memory; and
applying the information in the memory use table to identify a desired data unit within the fixed-size memory unit.

24. The method of claim 23, further comprising:
receiving an input key for the desired data unit; and
determining whether to grant access to the desired data unit at least in part by comparing the input key to the key stored in the memory use table for the desired data unit.

25. The method of claim 24, wherein the memory use table further stores, for each data unit, an access right associated with the key; and
wherein determining whether to grant access further comprises deteimining whether a desired use of the desired data unit is permitted by the access right associated with the input key.

26. The method of claim 24, wherein determining whether to grant access comprises determining whether to identify the desired data unit within the fixed-size memory unit.

27. The method of claim 22, wherein storing the plurality of data units within the fixed-size memory unit comprises storing at least a first data unit and a second data unit in such a manner that the first and second data units overlap.

28. The method of claim 27, wherein storing the first data unit and the second data unit in such a manner that the first data unit and the second data unit overlap comprises determining whether at least a first portion of data of the first data unit and at least a second portion of data of the second data unit have same values, and
when the first portion and the second portion have the same values, storing the first portion and the second portion in a same location in the fixed-size memory unit of the first memory.

29. The method of claim 22, wherein the location of the data unit stored in the memory use table comprises an offset value of the beginning of the data unit from the beginning of the fixed-size memory unit and a size of the data unit.

30. The method of claim 22, wherein the plurality of data units are stored in the first memory and the memory use table is stored in a second memory.

31. A method of storing data in a first memory, the first memory being divided into at least one fixed-size memory unit, the first memory being adapted to read and write data in units of a minimum size, the method comprising:
storing a plurality of data units within a fixed-size memory unit, the fixed-size memory unit having a size equal to the minimum size and each of the plurality of data units being of a size less than the minimum size;
storing a memory use table comprising information on data stored in subsets of each of the plurality of data units within the fixed-size memory unit; and
upon receiving a request for first data stored in a subset:
retrieving an entire fixed-size memory unit from the first memory, and
using the table to locate the first data in the fixed-size memory unit.

* * * * *

UNITED STATES PATENT AND TRADEMARK OFFICE
CERTIFICATE OF CORRECTION

| | | |
|---|---|---|
| PATENT NO. | : 8,171,252 B2 | Page 1 of 1 |
| APPLICATION NO. | : 11/102040 | |
| DATED | : May 1, 2012 | |
| INVENTOR(S) | : Didier Ingels et al. | |

It is certified that error appears in the above-identified patent and that said Letters Patent is hereby corrected as shown below:

Claim 8, col. 6, line 59, should read:
access is a type of access permitted by the specific access Claim 12, col. 7, line 7, should read:
a second memory storing first information, the first infor- Claim 25, col. 8, line 59, should read:
prises determining whether a desired use of the desired Signed and Sealed this
Twelfth Day of June, 2012

David J. Kappos
*Director of the United States Patent and Trademark Office*